United States Patent [19]

Yatchum et al.

[11] Patent Number: 5,056,377

[45] Date of Patent: Oct. 15, 1991

[54] TAP SELECTOR ANTI-ARCING SYSTEM

[75] Inventors: Joseph W. Yatchum, McMurray; Clarence K. Hess, Beallsville, both of Pa.

[73] Assignee: Cooper Industries, Inc., Houston, Tex.

[21] Appl. No.: 434,917

[22] Filed: Nov. 9, 1989

[51] Int. Cl.[5] ...................... F16H 27/00; H01H 19/54

[52] U.S. Cl. ...................................... 74/436; 74/526; 200/11 TC

[58] Field of Search .............. 74/436, 526; 200/11 TC

[56] References Cited

U.S. PATENT DOCUMENTS

| | | | |
|---|---|---|---|
| 2,785,242 | 3/1957 | White | 200/11 TC |
| 3,396,248 | 8/1968 | Wilson, Jr. | 200/11 TC |
| 3,396,254 | 8/1968 | Bleibtreu | 200/11 TC X |
| 3,445,611 | 5/1969 | Bleibtreu et al. | 200/11 TC X |
| 3,485,965 | 12/1969 | Bleibtreu et al. | 74/436 X |

*Primary Examiner*—Allan D. Herrmann

*Attorney, Agent, or Firm*—Donald Verplancken; David Rose; Ned Conley

[57] ABSTRACT

A tap selector anti-arcing system is used with rotary tap selectors to prevent arcing as the selectors move from one tap to the other. A lockout mechanism includes a pair of lever arms located adjacent two Geneva gears. The Geneva gears include pins disposed on opposed sides thereof to actuate one lever arm to thereby move the other lever arm to interferingly engage the pin on the other gear if the gears move simultaneously to engage the neutral and eighth taps. An interrupter is opened by linkage connected to a cam disposed on the drive mechanism for the Geneva gears to open the circuit during the movement of the Geneva gears from one tap to another.

10 Claims, 7 Drawing Sheets

TAP SELECTOR ANTI-ARCING SYSTEM

BACKGROUND OF THE INVENTION

This invention relates to the field of high voltage electrical distribution equipment, more particularly to the control and transfer of high voltages to ultimate loads through electrical transformers, and more particularly to mechanisms used to control transformer secondary circuit voltage under varying electrical loads and to prevent arcing during the selection of winding taps.

The typical electric distribution system includes a power source, such as a hydroelectric dam or a coal or nuclear fired generating station, a high voltage three-phase distribution system, and line transformers to step down the distribution line voltage to a value acceptable to the end user.

To reduce power loss caused by the resistance of the distribution power lines, the main power transmission lines emanating from the power source to the local power substation typically carry voltage potentials in excess of one hundred thousand volts. However, electricity at such high potential is unsuitable for almost all industrial and residential use. Therefore, the voltage is stepped down at a substation adjacent the user of the electricity by a power transformer. The output of the power transformer will typically be on the order of 1300 volts. Electricity of this voltage is then supplied on power lines to industrial and residential areas, where further transformers may be used to lower the voltage to 440 volts, 120 volts, etc.

The power transformer is constructed having a high voltage winding, a secondary winding and a magnetic core. The high voltage winding consists of a wire wound in a series of wire loops around the core, the ends of which are connected to the high voltage distribution system. The secondary winding is likewise comprised of a series of wire loops wrapped around the metal core. The secondary winding has a far fewer number of windings than the high voltage winding. Thus, the voltage induced on the secondary winding is far lower than that on the high voltage winding. The secondary winding is connected to the ultimate local load distribution system.

Although, because of the effect of line losses and other non linear effects, the ratio of primary to secondary coil windings does not exactly match the ratio of input or primary voltage to output or secondary voltage, the correspondence is close enough to permit fine voltage regulation on the secondary voltage side of the transformer by making slight modifications in the number of secondary windings which are in conductive engagement with the load. This is accomplished by placing a series of leads, or taps, in conductive engagement with the secondary coil at an evenly spaced number of windings apart. For example, if a ten percent variation were required, a tap would be placed on the transformer secondary coil at approximately ten percent of the windings from the end of the secondary coil. Further refinement in that ten percent variation may be accomplished by further subdividing the final ten percent of the windings with additional taps.

If the load on the secondary circuit varies, it can cause the voltage in the secondary circuit to likewise vary. For example, if the load increases, the voltage in the secondary circuit will decrease. Likewise, load decreases in the secondary circuit will increase the voltage in the secondary circuit. Such variations in line voltage can be detrimental to the performance and life of industrial equipment, and annoying to residential electricity users.

To address the load voltage variation, a load tap selector is used. A load tap selector is a device which employs a secondary circuit voltage detector which actuates a mechanical linkage to selectively engage the winding taps with the secondary circuit in response to load variation induced secondary circuit voltage variation. The load tap selector typically contains a triplicate set of parts to induce tap changes on all three phases of the three-phase circuit.

One common load tap selector is a rotary load tap selector. This is a mechanical device which selectively engages the winding taps by actuating rotary tap selector arms which conductively and mechanically engage metal clips which are in turn wired to the winding taps. One part of the rotary selector arm engages the metal clip, while another part maintains engagement with a slip ring which is wired to the load circuit. The selector includes three pairs of coaxially disposed rotary selector arms, each of which is engaged with one of a pair of Geneva gears. The engagement of a selector arm to a specific tap winding clip completes an electric circuit from the tap winding through slip rings to the load circuit on a phase. The tap winding clips are equally arcuately disposed in a circle about a slip ring so that rotation of the selector wheel in specific arcuate steps creates an electrical path through the specific tap winding to the secondary circuit through the slip rings.

To prevent excessive arcing when the tap winding clips are engaged and disengaged, the tap winding selector includes a pair of split switching reactors, a vacuum interrupter disposed between the reactors, and a pair of bypass switches disposed between the reactors and the loads. The bypass switches and interrupter open the circuit between a tap and the load, which prevents arcing, as the tap selector arm disengages a tap and engages an adjacent tap.

Typically, the tap selector includes two rotary selector wheels engaging tap clips electrically connected to the tap windings to select one of a range of voltages of plus or minus ten percent of rated secondary circuit voltage in $\frac{5}{8}$ percent voltage steps. Therefore, for a plus or minus ten percent voltage variation, nine tap clips are disposed in a circular pattern around the slip ring for engagement by contacts connected to the selector wheels. One of the tap clips is a neutral tap clip. A reversing switch is employed to permit each tap clip to be selectively engaged with one of two sets of taps equally disposed from the neutral tap clip. The neutral tap is located at the rated voltage winding on the secondary circuit. The switch connects the tap clips to the high voltage side or the low voltage side of the neutral tap. Where the neutral tap is located at ten percent of the windings from the end of the transformer, this configuration permits sixteen voltage changes per wheel for a total of thirty-two stepped voltage changes and a total percentage variation of twenty percent.

In the neutral, or rated output winding position, both rotary selector wheels engage the neutral tap at the neutral position and also engage the two slip rings. To increase the number of effective windings on the high voltage side of neutral, the first selector arm is moved clockwise to the first tap selector clip, adding energized windings to the secondary coil to increase the secondary voltage $\frac{5}{8}$ percent. To further increase the effective number of windings, the second selector arm is moved counter-clockwise to the first selector clip further adding energized windings to the secondary side of the transformer, and at the same time flipping the reversing switch. Successive increases in voltage are effected by further movement of the selector wheels until both wheels engage the eighth or last tap selector clip. To decrease the voltage on the high voltage side, the arcuate movement of the wheels is reversed (clockwise), until the original neutral position is regained. In moving from the first position back to neutral, the reversing switch is again flipped. Each reverse step, while the reversing switch is located to link the taps on the high side of the neutral tap, results in an output voltage reduction.

To decrease the voltage on the low voltage side of the neutral position, the reversing switch must be changed to the low side. As referenced above, this is accomplished as the tap clips regain the neutral position. When the reversing switch is flipped, the tap clips are connected to a second set of winding taps disposed in an equal and opposite direction from the neutral position. Then subsequent counter-clockwise motion of the wheels to arcuately actuate the tap clips reduces the effective output voltage. Selection of the appropriate voltage is effected by arcuately rotating the selector wheels to the proper tap winding clip.

The structure of the rotary tap selector is such that maintenance to assure gear synchronization is absolutely essential. If one of the selector arms engages the neutral tap winding while the remaining selector arm is engaged on the eighth tap, the transformer will short circuit across the secondary winding resulting in complete transformer failure. This will occur if both arms are engaged on the eighth tap, and selector arm progress one step to the neutral tap. In the past, the only means of preventing this condition was vigilant maintenance to assure that all parts were synchronized to maintain proper alignment. However, improper maintenance, as well as long term wear of the load tap changer components, can result in misalignment and transformer failure. The present invention overcomes the deficiencies of the prior art.

SUMMARY OF THE INVENTION

The present invention includes a tap selector anti-arcing system to prevent arcing as the rotary tap selectors move from one winding tap to another. The rotary tap selector includes a housing having a partition therein to form a gearing compartment and a selector compartment. An insulator panel is disposed in the selector compartment. Two slip rings are mounted in the selector compartment, one on the insulator panel and the other on the partition. A plurality of taps are mounted on the insulator panel in a circle about the slip ring. Each of the taps are electrically connected to one of the winding taps. One of the taps is a neutral tap. Adjacent the neutral tap are mounted a high and low voltage reversing tap.

Two Geneva gears are mounted on coaxial shafts rotatably disposed on the partition. These gears are disposed in the gearing compartment. Each of the coaxial shafts have contact arms mounted thereon within the selector compartment such that rotation of the Geneva gears will cause the rotation of the contact arms. Each contact arm has two sets of contacts. One set of contacts is in continuous electrical engagement with a slip ring and the other set of contacts is in electrical engagement with one of the taps mounted on the insulator panel. A lever arm is rotatably mounted in the gearing compartment and also includes contacts. The arm has a high voltage position where the contacts extend between the neutral tap and the high voltage reversing tap and a low voltage position where the contacts extend between the neutral tap and the low voltage reversing tap. A pin is mounted on one of the Geneva gears to engage the lever arm as the contact arm of that Geneva gear passes the neutral tap. The movement of this pin causes the lever arm to toggle between the high or low voltage reversing taps.

A drive shaft extends through the gearing compartment and is attached to a drive mechanism to selectively rotate the drive shaft to vary the voltage a predetermined amount. A pinion arm is mounted on the drive shaft and includes two pins, one of the pins engaging each of the two Geneva gears such that as the drive shaft is rotated, the pins rotate the Geneva gears 40, moving the contact arms from one tap to another.

A bypass switch is connected in the secondary circuit to open the circuit as the contact arms move from one tap to another. The bypass switch includes bypass switch blades projecting from the insulator panel and a bypass switch arm mounted in the gearing compartment. The bypass switch arm has a follower pin on one end which engages a cam mounted on the drive shaft. As the cam rotates on the drive shaft, the follower pin causes the bypass switch arm to move in and out of electrical engagement with the bypass switch blades so as to open and close the secondary circuit as the contact arms move from one tap to another.

The secondary circuit also includes an interrupter. The interrupter is a switch. A cam member is mounted on the drive shaft and a cam follower is disposed on linkage connected to the interrupter switch whereby as the cam rotates, the linkage causes the switch to open and close as the contact arms move from one tap to another.

A locking mechanism is mounted in the gearing compartment between the Geneva gears. The locking mechanism includes a locking member having two stops for engaging lock pins projecting from each of the Geneva gears. Biasing means is disposed on the locking mechanism to bias the locking member against one of the two stops whereby as one lock pin engages the locking member, the locking member moves against one of the stops to prevent the further rotation of the locking pin on the other Geneva gear.

The interrupter and locking mechanism prevent arcing as the contact arms move from one tap to another. These and other objects and advantages of the invention will become apparent from the following description and accompanying drawings.

BRIEF DESCRIPTION OF THE DRAWING

For a detailed description of the invention, reference will now be made to the following drawings, wherein.

BRIEF DESCRIPTION OF THE PREFERRED EMBODIMENT

Figure 1:
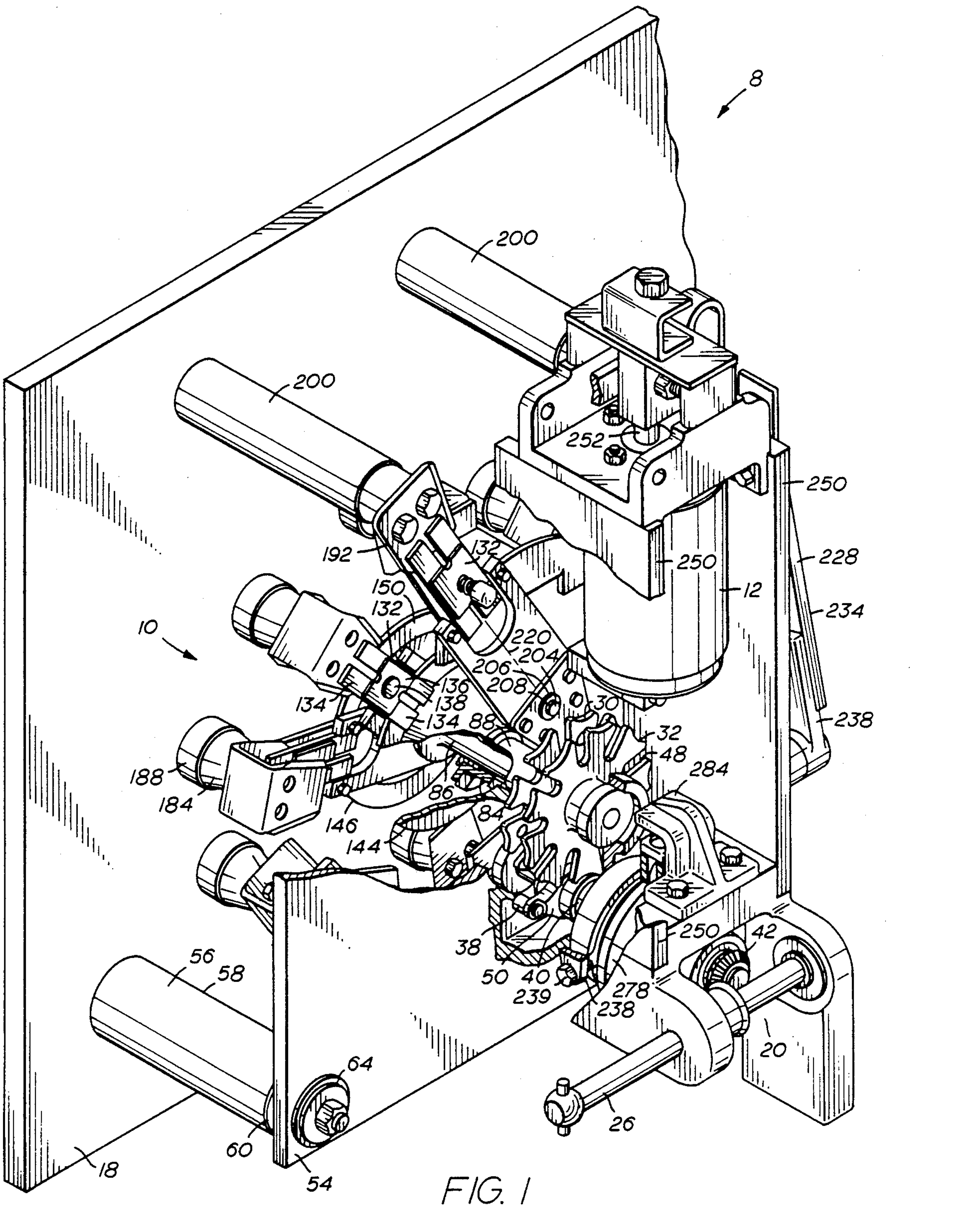
FIG. 1 a cutaway perspective view of the tap changer of the present invention.

Referring initially to FIG. 1, the rotary tap selector 8 of the present invention includes a rotary tap selector switch 10 and an interrupter 12 disposed in an oil-filled compartment. There are three rotary tap selector switches and interrupters, one for each of the three phases. Only one set will be described for purposes of the present invention since each set is the same as the others. A tap selector switch insulator panel 18 is located between the compartment and a series of transformer windings and forms an oil-tight barrier therebetween. A drive mechanism is connected in mechanical driving engagement with each tap selector switch 10 by a universal drive shaft 26 disposed through the bottom of oil-filled compartment 14.

Figure 3:
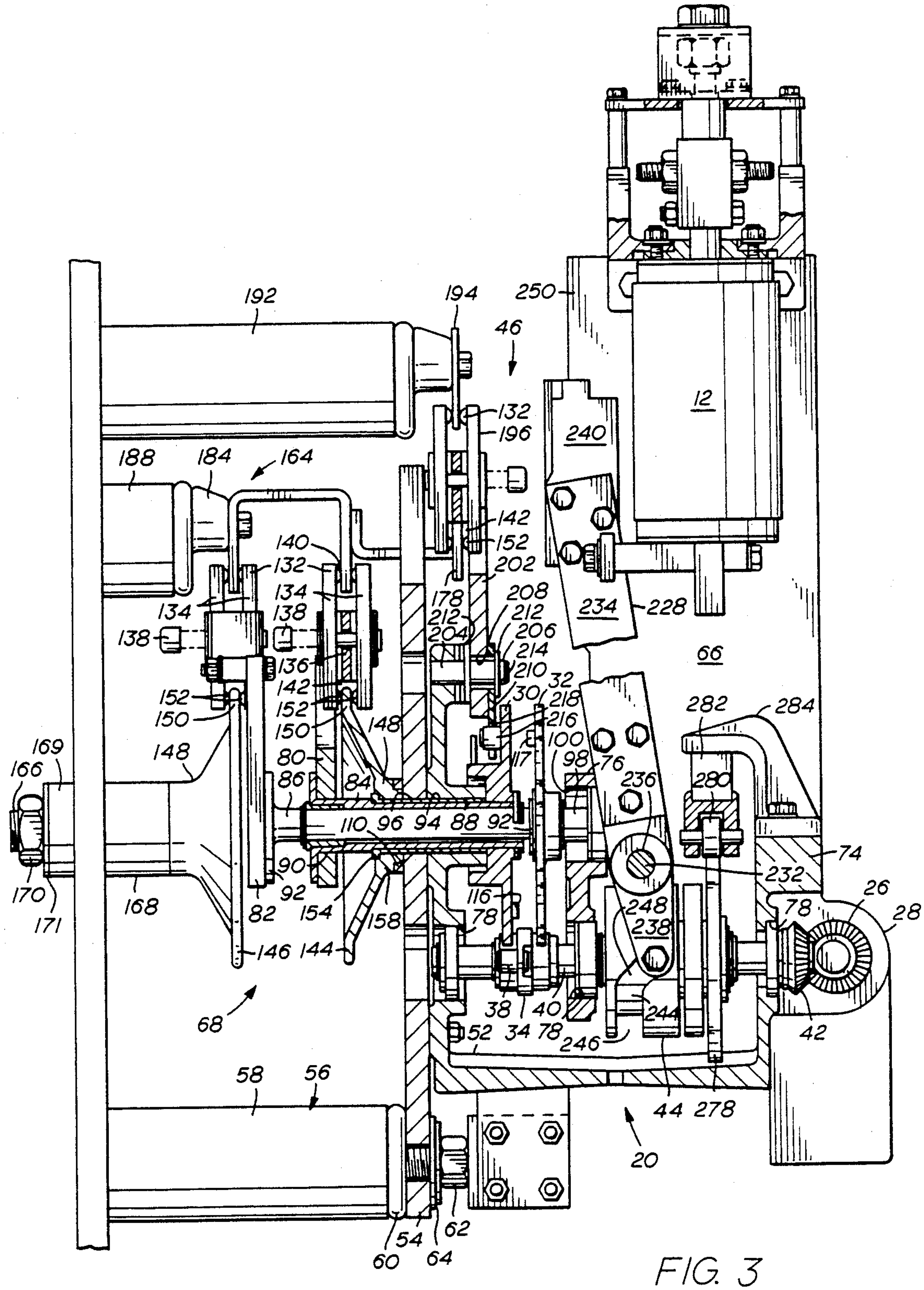
FIG. 3 is a side view of the tap changer shown in FIG. 1.

Referring now to FIGS. 1 and 3, each tap selector switch 10 includes an inner Geneva gear 30 and an outer Geneva gear 32, relative to panel 54, concentrically disposed to each other for selected arcuate rotation. A pinion arm 34 has a drive pin 38 on one end for engaging inner Geneva gear 30 and another drive pin 36 on the other end for engaging outer Geneva gear 32. Pinion arm 34 is mounted on a drive shaft 40 connected to universal drive shaft 26 for causing pins 36, 38 to selectively engage Geneva gears 30, 32. Drive shaft 40 extends from pinion lever 34 and terminates at universal gear 42. A cam actuator 44 is also disposed on drive shaft 40 for actuating bypass switch 46 to selectively transfer current flow through an interrupter during tap changes.

Figure 2:
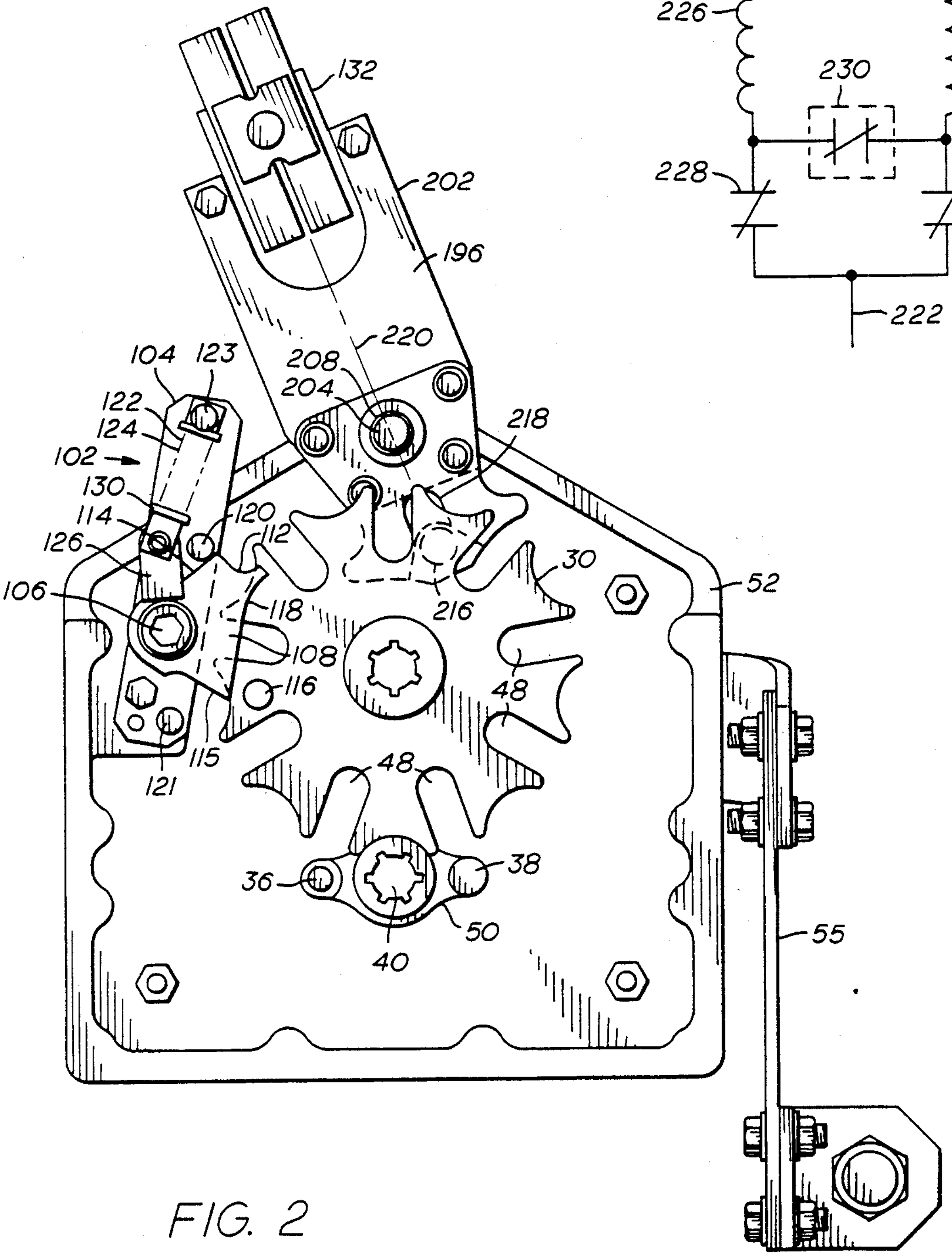
FIG. 2 is a cutaway frontal view of the rotary tap changer shown in FIG. 1.
Figure 15:
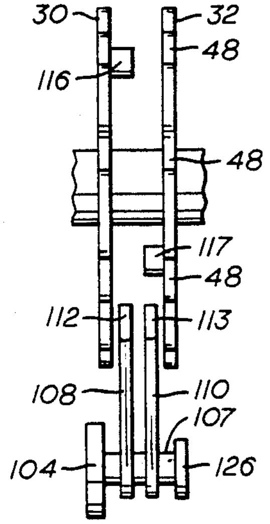
FIG. 15 is a top view of the Geneva gears and lockout mechanism of 2.

Referring now to FIGS. 2, 3 and 15, Geneva gears 30, 32 each have a series of radial slots 48 sized to slidingly accept drive pins 36, 38 of pinion arm 34. A radial slot 48 is provided for each of the tap winding selector positions. Therefore, in a nine position selector, there are nine radial slots 48 disposed in the outer circumference of each Geneva gear 30, 32. Drive pins 36, 38 and pinion arm 34 are located on drive shaft 40 between Geneva gears 30, 32 with drive pin 38 extending toward inner Geneva gear 30 and drive pin 36 extending toward outer Geneva gear 32 such that pins 36, 38 will be received into one of the radial slots 48 upon rotation of pinion arm 34. The rotation of drive shaft 40 through an arc of 180° causes pins 36, 38 to travel through a semicircular arc, with one of the pins 36, 38 sliding into one of slots 48, and engaging one of the Geneva gears 30, 32 rotating the Geneva gear through a rotation of 40°. The subsequent movement of drive shaft 40 another 180° in the same direction causes the other drive pin 36 or 38 to be received in one of the slots 48 in the other Geneva gear causing that gear to rotate 40°.

Best shown in FIGS. 2 and 3, Geneva gears 30, 32 and drive shaft 40 are supported in a secondary housing 52 located within oil-filled compartment 14. Secondary housing 52 is preferably a machinable casting, and is mounted on standoff panel 54. Standoff panel 54 is preferably a thick sheet of insulative material, and is mounted to insulator panel 18 by standoff mounts 56. Each standoff mount 56 is comprised of a thin walled tubular member 58 and compressible member 60 located between insulator panel 18 and standoff panel 54. Mount 56 is supported therebetween by panel mounting bolt 62 which bears on washer 64 on standoff panel 54 and retains tubular member 58 between insulator panel 18 and standoff panel 54. Standoff panel 54 subdivides oil-filled compartment 14 into gearing subcompartment 66 located substantially within secondary housing 52 and selector subcompartment 68 located between insulator panel 18 and standoff panel 54. Standoff panel 54 helps electrically insulate the oil-filled compartment from gearing subcompartment, thus insulating the areas of differing electrical potential.

Referring particularly to FIGS. 2 and 3, secondary housing 52 includes a gabled wall 70 extending normal to base 72 opposite a secondary support wall 74. An intermediate web 76 is disposed on base 72 between gabled wall 70 and secondary support wall 74. Drive shaft 40 is piloted through coaxial pinion bores 78 in gabled wall 70, secondary support wall 74 and intermediate web 76. Universal gear 42 protrudes through pinion bore 78 in secondary support wall 74. Gabled wall 70 is bolted to standoff panel 54 to retain secondary housing 52 thereon.

Geneva gears 30, 32 are mounted on tubular shaft 84 and solid shaft 86, respectively, which extend through gabled wall 70 and standoff panel 54 and are supported therein by sleeve bearing 88. Sleeve bearing 88 is preferably constructed from bronze.

Inner Geneva gear 30 is mounted circumferentially about one end of shaft 84 and an inner tap selector arm 80 is mounted on its opposite end adjacent standoff panel 54. Inner tap selector arm 80 is a rectangular insulative member having a piloted bore 90 at one end for receiving the end of tubular shaft 84 therein. The end of shaft 84 contains six equally spaced teeth which engage matching recesses in piloted bore 90. Thus, the rotary motion of inner Geneva gear 30 is translated to inner tap selector arm 80 by tubular shaft 84.

Outer Geneva gear 32 is mounted on one end of shaft 86 and an outer tap selector arm 82 is mounted on the other end outside inner arm 80. Shaft 86 is rotatably disposed within tubular shaft 84. Solid shaft 86 has opposed splined ends 92 which engage outer Geneva gear 32 and outer tap selector arm 82 to translate rotational movement of outer Geneva gear 32 into equal rotational movement of outer tap selector arm 82.

Sleeve bearing 88 is supported in housing pilot 94 of secondary housing 52 and panel pilot 96 which is coaxially aligned with housing pilot 94. Sleeve bearing 88 rotatably supports shafts 84, 86, thereby supporting insulator arms 80, 82 and Geneva gears 30, 32. Geneva gear 32 is further supported by a secondary support shaft 98 extending through secondary pilot 100 in web 76. Secondary pilot 100 is also coaxial with housing pilot 94.

Referring now to FIGS. 2 and 10–15, there is shown a selector gear travel limiting means for limiting the travel of the Geneva gears 30, 32. A lockout mechanism 102 is disposed adjacent Geneva gears 30, 32, and includes a mounting arm 104, disposed on a boss 105 on gabled wall 70, and inner and outer lockout arms 108, 110 mounted on a sleeve 107 which is rotatably disposed on stud 106 projecting from arm 104. Lockout arms 108, 110 project from stud 106 adjacent the sides of Geneva gears 30, 32. Lockout arms 108, 110 are planar sections having a curveform perimeter 111. Curveform perimeter 111 includes on lockout arms 108, 110, respectively, arcuate pin recesses 112, 113 and pin limit walls 114, 115 disposed on opposed ends of a rocker face walls 118, 119. Mounting arm 104 further includes two limit pins 120, 121 projecting therefrom equidistant from stud 106. Geneva gears 30, 32 include lockout trip pins 116, 117, respectively, projecting inward from the opposed faces thereof, best shown in FIG. 15. Lockout arms 108, 110 are spaced on stud 106 to locate arcuate rocker face walls 118, 119 adjacent the inner opposed faces of Geneva gears 30, 32.

Figure 13:
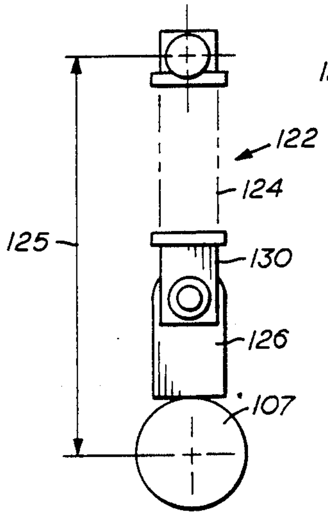
FIG. 13 is a front view of the toggle mechanism of the lockout mechanism of FIG. 2.
Figure 14:
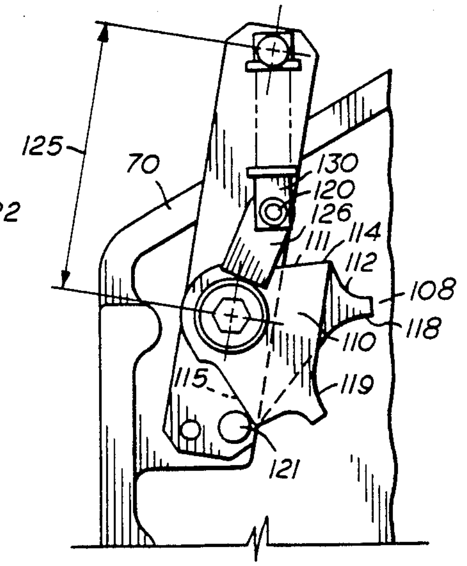
FIG. 14 is a front view showing the interaction of the toggle mechanism and lockout arms of the lockout mechanism of FIG. 2.

Lockout arms 108, 110 are interconnected on sleeve 107 about stud 106, such that the arcuate movement of either arm 108, 110 will cause the other arm to travel equally in the same arcuate direction. A toggle 122 is mounted on arm 104 and is articulately interconnected to sleeve 107. Toggle 122 maintains the pin limit walls 114, 115 of lockout arm 108, 110 in engagement with one of the limit pins 120, 121. Toggle 122 includes a spring piston section 124 articulately mounted to a lockout arm mount 126. Spring piston 124 with a plunger 130, is mounted to mounting arm 104 at spring mount 123 for rotation and articulated movement thereabout. Lockout arm mount 126 is fixedly mounted to lockout arms 108, 110 on sleeve 107 over stud 106. The other end of lockout arm mount 126 is articulately mounted to piston section 124 through plunger 130. Piston section 124 is biased either by a spring, or by hydraulic actuation, to tend to force plunger 130 out of piston section 124. As best shown in FIGS. 13 and 14, when lockout arm mount 126 and piston section 124 are colinearly disposed free of mounting arm 104, the free toggle distance 125 between spring mount 123 and sleeve 107 is at its maximum. When lockout arm mount 126 and piston section 124 are colinearly disposed on mounting arm 104, free toggle distance 125 is decreased and the spring is under compressive stress which tends to cause lockout arm mount 126 to arcuately articulate about stud 106. As lockout arm mount 126 is mounted to lockout arms 108, 110, piston section 124 of toggle 122 will tend to force pin limit walls 114, 115 against one of the limit pins 120, 121.

Figure 12:
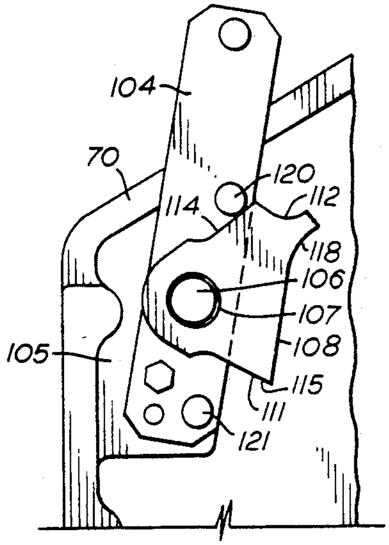
FIG. 12 is a front view of one of the lockout arms of the lockout mechanism of FIG. 2.

Referring now to FIGS. 2 and 14, the actuation of lockout arms 108, 110 about stud 106 is demonstrated. In FIG. 14 lockout arm 108 is disposed to interferingly engage pin 116 on Geneva gear 30 if gear 30 is rotatably actuated 9 counterclockwise steps. Pin 116 will interferingly engage pin recess 112 if arcuate movement of Geneva gear 30 is effected beyond the eighth step, i.e., when the gear selector attempts to move from eight to nine counterclockwise steps. If the Geneva gear 30 moves one step in the counterclockwise direction from the position shown in FIG. 14, pin 116 will engage rocker face wall 118 of lockout arm 108 thereby arcuately actuating lockout arm 108 about stud 106, thereby simultaneously actuating lockout arm 110 about stud 106 such that pin limit wall 114 of lockout arm 108 engages pin 120 as shown in FIGS. 2 and 12 The arcuate movement of lockout arms 108, 110 actuates sleeve 107 about stud 106, thereby actuating toggle 122 to bias pin limit wall 114 of lockout arm 108 against limit pin 120. With lockout arm 108 in position against pin 120, pin recess 113 of lockout arm 110 is radially disposed between Geneva gears 30, 32 to interferingly engage pin 117 on Geneva gear 32 if Geneva gear 32 is rotated clockwise to place pin 117 adjacent lockout arm 110.

As shown in FIGS. 2 and 12, the lockout mechanism 102 is in position to block clockwise rotational movement of outer Geneva gear 32. To establish this position, drive shaft 40 rotates to induce stepped clockwise rotation of Geneva gears 30, 32, inner Geneva gear 30 moves 40°, then outer Geneva gear 32 moves 40°, causing the lockout trip pin 116 thereon to engage rocker face wall 118 of lockout arm 108 thereby arcuately moving lockout arm 108 about stud 106. Such movement causes toggle 122 to arcuately move and ultimately force pin limit wall 114 on lockout arm 108 to engage limit pin 120. Such movement causes lockout arm 110 to arcuately rotate and place pin recess 113 thereof within the circumferential arc of travel of lockout trip pin 117 on outer Geneva gear 32. Continued actuation of drive shaft 40 through sixteen more 180° revolutions to rotate Geneva gears 30, 32 will ultimately cause lockout trip pin 117 on outer Geneva gear 32 to be disposed adjacent pin recess 113 on outer lockout arm 110. If the Geneva gears 30, 32 are out of alignment, pin recess 113 will engage lockout trip pin 117 to prevent further travel of outer Geneva gear 32 thereby preventing an improper alignment of the tap selector arms 80, 82 which could cause a short circuit condition.

If Geneva gears 30, 32 are rotated in a clockwise direction to reduce the number of effective transformer windings, lockout trip pin 116 on inner Geneva gear 30 will engage rocker face wall 118 on inner lockout arm 1089 on the seventeenth gear step from the counterclockwise position of the tap selector 8, thereby locating pin recess 113 on lockout arm 110 in position to engage lockout pin 117 on outer Geneva gear 32 after 15 more clockwise gear steps. Thus, lockout mechanism 102 does not interfere with the normal actuation of tap selector 8, but only engages Geneva gears 30, 32 if an overtravel or misalignment condition arises.

Referring again to FIGS. 1 and 3, inner and outer tap selector arms 80, 82 have disposed thereon a pair of opposed contact plates 134 having a contact spacer 136 disposed therebetween. Opposed contact plates 134 and contact spacer 136 are held together and affixed to the free end of insulating arms 80, 82 by contact spring pin 138. Contact spacer 136 is shorter than opposed contact plates 134 creating an outer contact gap 140 and inner contact gap 142 at the inner and outer terminus of contact spacer 136. A pair of outer contacts 132 and inner contacts 152 are mounted on moveable opposed contact plates 134 and project into outer and inner contact gaps 140, 142, respectively. Outer contacts 132 have selected contact with tap clips 164 Wired to individual winding taps, and inner contacts 152 have continuous electrical contact with slip rings 144, 146 as hereinafter described.

Figure 6:
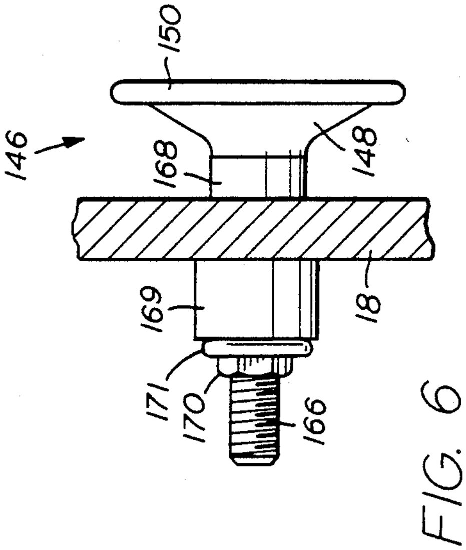
FIG. 6 is a partial side view of the slip ring mounting configuration tap changer of FIG. 1.

Referring now to FIGS. 3 and 6, selector subcompartment 68 includes an inner slip ring 144 and an outer slip ring 146 mounted therein for engagement with moveable contacts 152. Slip rings 144, 146 are frustoconical members having a central radial inner section 148 and an outer radial lip 150 projecting circumferentially therefrom. Slip rings 144, 146 are disposed in selector subcompartment 68 such that inner contact gap 142 of each moveable contact 152 extends around the circumference o outer radial lip 150 of one of the slip rings 144, 146. Inner contacts 152 and outer contacts 132 ensure electrical contact between selected tap clips 164 and slip rings 144, 146. Inner contacts 152 continuously ride upon the opposed faces of outer radial lip 150 as moveable outer contacts 132 arcuately progress in selector compartment 6 in selective engagement with tap clips 164 in response to rotary motion of Geneva gears 30, 32.

Inner slip ring 144 is mounted circumferentially about sleeve bearing 88 adjacent standoff panel 54. Sleeve bearing 88 protrudes into selector subcompartment 68, and includes a flange 154 thereon at its terminus. Inner radial section 148 of slip ring 144 includes an inner flange pilot 158 which receives flange 154. The outer radius 158 of inner radial section 148 includes a buss contact which is wired to a first buss (not shown) for the distribution of electric current from secondary circuit within tap selector 8. Inner radial section 148 of slip ring 144 is keyed to sleeve bearing 88, and therefore remains stationary as inner insulating arm 80 arcuately progresses in response to the movement of inner Geneva gear 30.

Referring now to FIGS. 3 and 6, outer slip ring 146 is mounted to insulator panel 18 in spaced coaxial alignment with sleeve 88 and inner slip ring 144. Slip ring 146 includes a slip ring stud 166 which protrudes through insulator panel 18 to retain slip ring 146 thereon, and a standoff ring 168 which is located between slip ring 146 and insulator panel 18. Standoff ring 168 is an annular right cylindrical member coaxially disposed about stud 166 and maintains outer radial lip section 150 in parallel relationship with insulator panel 18. Stud 166 is retained on insulator panel 18 by panel nut 170 which bears upon a panel spacer 169 and Belleville washer 171. Panel spacer 169 is an annular right cylindrical member which forms a bearing surface for Belleville washer 171. Belleville washer 171 is placed over stud 166, and panel nut 170 is tightened over stud 166 until it presses Belleville washer 171 flat against panel spacer 169. Outer radial lip section 150 is located in selector subcompartment 68 for sliding arcuate engagement with inner contacts 152 projecting into inner contact gap 142 while outer contacts 132 on outer insulating arm 82 engage clips 164 in response to stepped arcuate movement of outer insulating arm 82 due to the rotary movement of outer Geneva gear 32.

Figure 4:
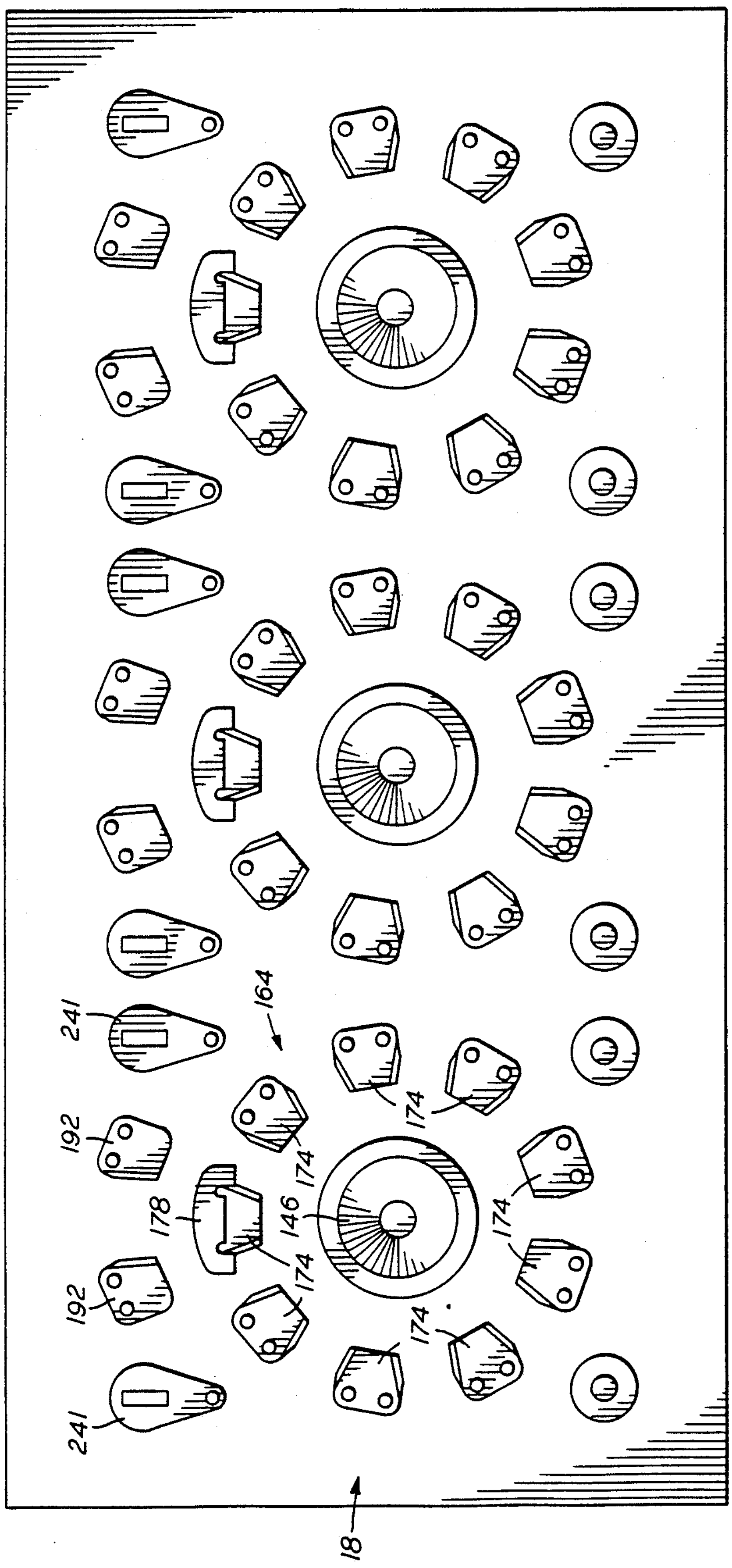
FIG. 4 is a front view of the insulated tap panel of the tap changer of FIG. 1.
Figure 7:
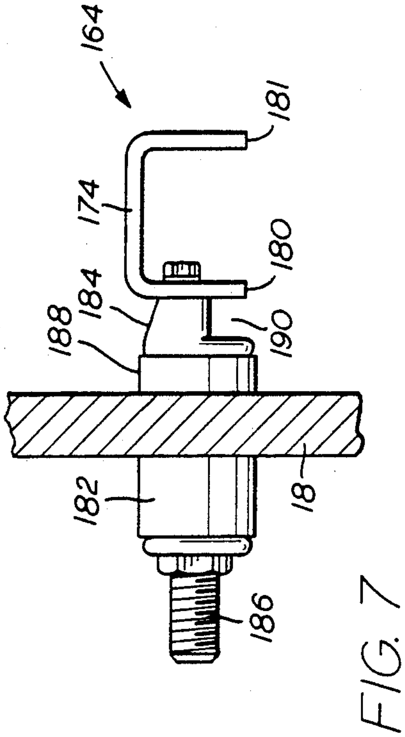
FIG. 7 is a side view of a selector tap clip of the tap changer of FIG. 1.
Figure 8:
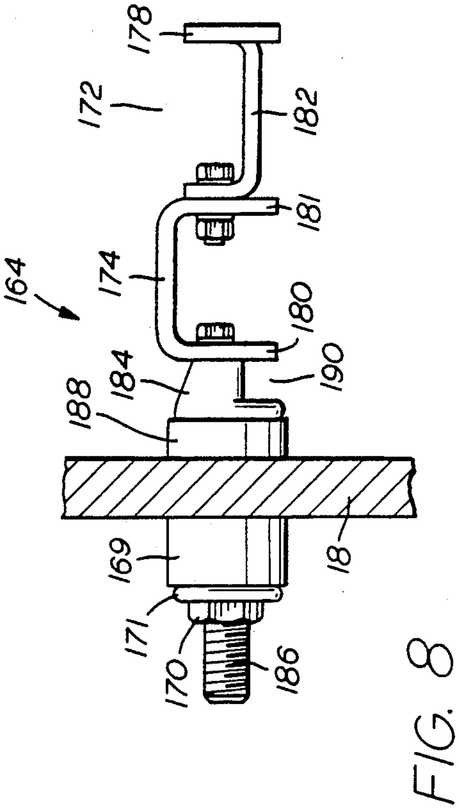
FIG. 8 is a side view of the neutral reversing tap clip of the tap FIG. 1.

Referring now to FIGS. 4, 7 and 8, tap clips 164 with stepping taps 174 are disposed circumferentially about outer slip ring 146 in even arcuate steps on insulator panel 18. A neutral reversing tap 172, shown in detail in FIG. 8, is mounted on a stepping tap 174 like that shown in FIG. 7, at the upper, or twelve o'clock position on insulator panel 18. In a thirty-two step changer, eight stepping taps 174 are disposed at 40° steps about a circle having its center at the axis of outer slip ring 146.

Reversing tap 172 includes a tap selector channel section 176 and a reversing blade 178 extending therefrom. Stepping tap 174 has a generally U-shaped section with inner and outer selector blades 180, 181 extending downward from the base of the U. Reversing blade 178 is disposed in parallel relation with selector blades 180, 181 and is mechanically and electrically connected thereto by a blade arm 182 which is bolted to outer selector blade 181. Reversing blade 178 is an arcuate wiper blade, and is wider than selector blades 180, 181.

Figure 9:
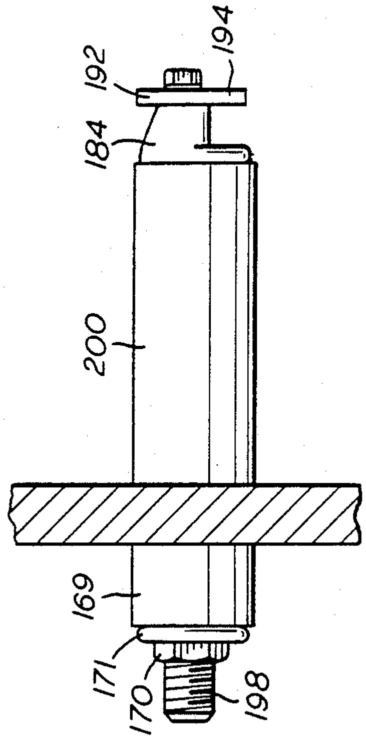
FIG. 9 is a side view of a reversing switch tap of the tap changer of FIG. 1.
Figure 10:
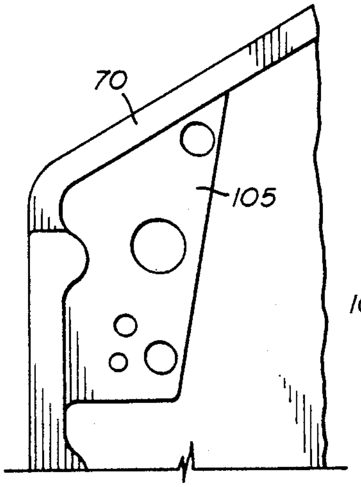
FIG. 10 a partial view of the lockout mounting boss area of the secondary housing of FIG. 2.
Figure 11:
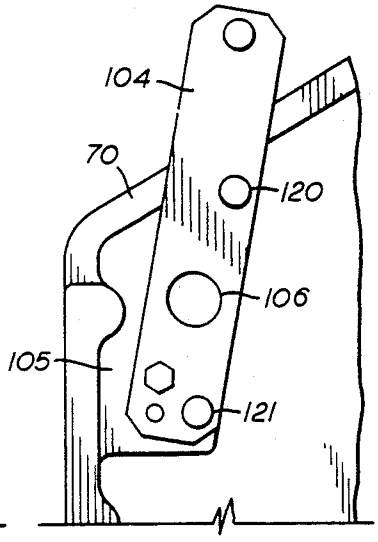
FIG. 11 is a front view of the mounting arm of the lockout mechanism of FIG. 2.

Referring now to FIGS. 8 and 9, each of the neutral reversing taps 172 and stepping taps 174 are mounted to insulator panel 18 through a mount 182. Each mount 182 includes a recessed copper forging 184 brazed to a tap stud 186 projecting therefrom through an annular insulator sleeve 188 to be retained within insulator panel 18. Recessed copper forging 184 is a conical section having a recess 190 disposed at the smaller end thereof. Each tap clip 164 is bolted to recessed copper forging 184 through first selector blade 180. Recess 190 is thus disposed adjacent first selector blade 180 and creates a clearance space for moveable outer contacts 132 to engage the end of first selector blade 180. Recessed insulator 184 is retained on insulator panel 18 by a panel nut 170 which is threaded onto tap stud 186 and bears upon Belleville washer 171 and panel spacer 169 to maintain selector blades 180, 181 and reversing blade 178 in parallel relation to outer radial lip 150 of inner and outer slip rings 144, 146.

Referring again to FIGS. 2, 4, and 9, insulator panel 18 further includes a pair of reversing switch tap clips 192 which are mounted adjacent reversing tap 172 opposite outer slip ring 172. Each reversing switch tap clip 192 includes a terminal blade 194 mounted to a recessed copper forging 184 by a bolt 185, and is disposed for contact with a reversing switch 196 shown in FIG. 2 and described further below. Recessed copper forging 184 is mounted to insulator panel 18 on elongated tap stud 198 which projects through an elongated sleeve 200 and is retained by a panel nut 170 threaded over stud 198 and bearing upon Belleville washer 171 and panel spacer 169. The sides of each tap clip 164 and the adjacent sides of reversing switch taps 192 are chamfered to facilitate the reception of moveable outer contacts 132 thereon.

Referring now to FIGS. 1, 2, and 3, reversing switch 196 is a lever arm 202 mounted on a bearing pin 204 projecting from arm 202 adjacent the upper terminus of gabled wall 70. Bearing pin 204 includes a snap ring recess 206 adjacent its outer terminus to receive a snap ring 214 for attachment to gabled wall 70. Lever arm 202 includes an arm pilot 208 which locates over bearing pin 204. Arm pilot 208 is a sleeve bearing which is disposed to rotate on bearing pin 204, and includes actuator arm 210 which extends radially therefrom opposite lever arm 202. To maintain lever arm 202 on bearing pin 204 and to ensure proper alignment thereof, washers 212 are disposed on the side of lever arm adjacent gabled wall 70 and on the outer surface of actuator arm 210. Snap ring 214 is then disposed in snap ring recess 206 to maintain lever arm 202 on bearing pin 204.

Lever arm 202 is a planar section of an electrically insulative material, and includes a pair of outer contacts 132 and inner contacts 152, such as those described with reference to arms 80, 82, bolted thereto opposite arm pilot 208. Moveable contacts 132, 152 are disposed on lever arm 202 such that inner contact gap 142 with inner contacts 152 receives the reversing blade 178, and outer contact gap 140 with outer contacts 132 selectively receives one of reversing blades 178 on reversing switch tap clips 192.

Lever arm 202 rotates between reversing switch taps 192 by interaction with inner Geneva gear 30. Inner Geneva gear 30 includes a reversing pin 216, shown in FIG. 3, which is disposed thereon projecting toward insulator panel 18. A longitudinal reversing slot 218 having a center axis 220 which intercepts the center of arm pilot 208 extends downward from lever arm 202 for reception of pin 216. Reversing pin 216 is disposed between adjacent radial slots 48 on inner Geneva gear, and will enter reversing slot 218 as inner Geneva gear 30 actuates from the neutral position to select fewer tap windings, or, when inner Geneva gear 30 actuates from the highest low setting to the neutral setting. Reversing switch taps 192, shown in FIG. 4, are disposed on insulator panel 18 40° apart by an arc measured from the center of bearing pin 204 to the center of each reversing switch tap 192. Thus, as reversing pin 216 of inner Geneva gear 30 is received in reversing slot 218, lever arm 202 is actuated to rotate moveable outer contacts 132 thereon from one to the other reversing switch tap 192.

Referring again to FIGS. 1, 3, and 4, movement of each Geneva gear 30, 32 will arcuately actuate each tap selector arm 80, 82 to progress the moveable outer contacts 132 thereon to the next adjacent tap clip 164. Thus, movement of drive mechanism 20 to rotate universal drive shaft 26 by 180 degrees causes rotation of one of Geneva gears 30, 32 by 40 degrees to arcuately actuate one of the tap selector arms 80, 82 through 40 degrees, thereby moving the moveable outer contacts 132 thereon from one tap clip 164 to the next tap clip 164.

Figure 5:
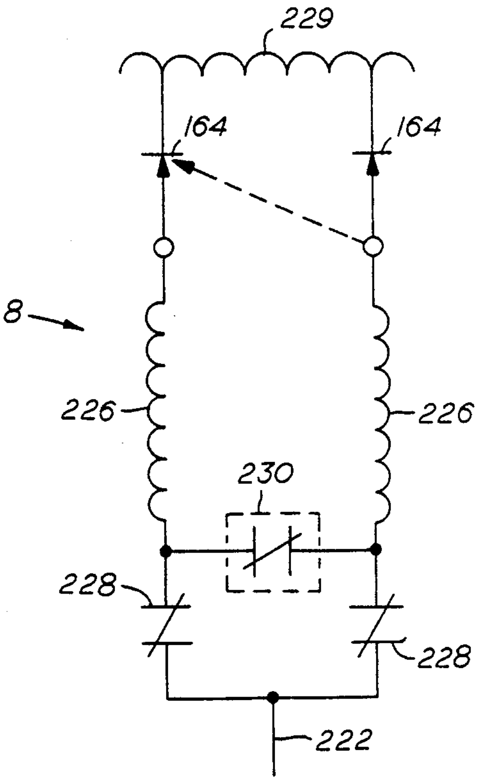
FIG. 5 is an electrical schematic of the rotary tap changer of FIG. 1.

Referring now to FIG. 5, which is an electrical schematic of the tap selector 8, the movement of moveable outer contacts 132 from one tap clip 164 to an adjacent tap clip 164 causes the voltage to vary at the load 222. Because tap clips 164 are wired directly to the transformer secondary windings 229 and the slip rings 144, 146 are wired to the load 222, the actuation of moveable outer contacts 132 between tap clips 164 creates at atmosphere conducive to electrical arcing. Therefore, a control circuit is employed to shunt or neutralize the current at the tap clips 164 just as moveable outer contacts 132 actuates therebetween. The control circuit includes a split switching reactor 226 and a bypass switch 46 disposed between each slip ring 144, 146 and the load 222. A vacuum interrupter 230 is bridged across the interface of each split switching reactor 226 and bypass switch 46. The use and interaction of these elements to suppress arcing in tap selectors is well known in the art.

Referring again to FIG. 3, a pair of bypass switch arms 228 are mounted in gearing subcompartment 66 on a support rod 232 adjacent a cam actuator 44 which is mounted transverse to drive shaft 40. Each bypass switch arm 228 includes a generally elongated planar member 234 having a pivot hole 236 for mounting on support rod 232. Each bypass switch arm 228 includes a cam follower 238 on one end and a switch contact member 240 on the other end with pivot hole 236 therebetween. Geneva gears 30, 32 are mounted between bypass switch arms 228 to selectively open and close the bypass switch 46 by selectively engaging switch contact members 240 onto bypass switch blade contacts 241 shown in FIG. 4. The engagement of switch contact members 240 on switch blade contacts 241 creates a circuit from one contact 241, through the bypass switch arms 228 and into the second switch blade contact. Rotary actuation of the cam actuator 44 actuates bypass switch arms 228 to pull off of switch blade contacts 241 to open the bypass switch.

Referring now to FIGS. 1 and 3, cam follower 238 includes a cam pin 239 which projects from cam follower 238 into a cam lead 244 in cam actuator 44. Lead 244 is a groove in cam actuator 44 extending 360 degrees thereabout, and includes an offset portion 246 and circular portion 248. Bypass switch arms 228 are mounted on support rod 232 to actuate thereabout in response to actuation of cam pin 239 in response to rotary movement of cam actuator 44. Rotary movement of drive shaft 40 rotates lead 244 past the cam pin 239 to locate offset portion 248 or circular portion 246 adjacent the cam pin 239. Offset portion 248 and circular portion 246 are offset longitudinally from each other, and circular portion 246 includes an offset lead portion 246 to actuate cam pin 239 between offset portion 248 and circular portion 246. Rotary motion of drive shaft 40 will move the cam pin 239 with respect to pivot hole 236, thereby pivoting planar member 234 about support rod 232. This movement actuates switch blade member 240 to open and close bypass switch 46 in response to the rotation of drive shaft 40 by engaging and disengaging switch blade contacts 241. Lead 244 is indexed to move bypass switch 46 to the open position as one of drive pins 36, 38 engage one of Geneva gears 30, 32 to actuate one of the tap selector arms 80, 82 to move from one tap clip 164 to an adjacent clip 164, and to close bypass switch 46 after one of the tap selector arms 80, 82 engages the adjacent tap clip 164.

Figure 16:
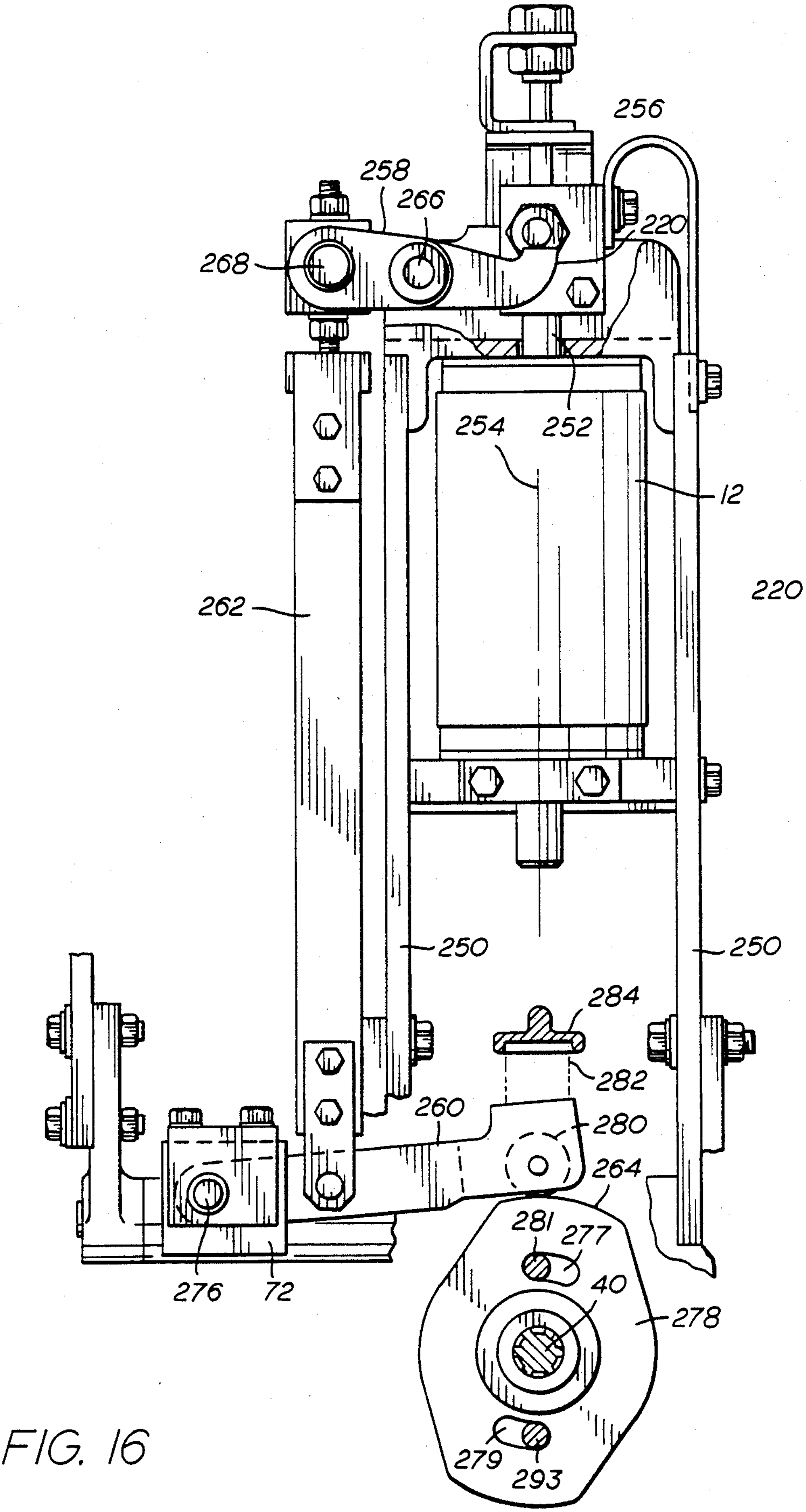
FIG. 16 is a side view of the interrupter actuator and linkage mechanism shown in FIGS. 1 and 3.

Referring now to FIGS. 1, 3 and 16, the actuation of interrupter 12 is accomplished in synchronization with the operation of bypass switch 46 and Geneva gears 30, 32 through drive shaft 40. Interrupter 12 is mounted in oil-filled compartment 14 by rails 250 which project upward from base 72 of secondary housing 52. Interrupter 12 is a generally cylindrical member having a longitudinal axis 254 therethrough which is substantially normal to base 72. Interrupter 12 includes a mechanical switch 256 which opens or closes interrupter 12 in response to the rotation of drive shaft 40. Interrupter 12 opens by an upward linear actuation of a plunger rod 252 into interrupter 12.

Switch 256 is a double-acting toggle switch having an upper actuated lever switch 258 and a lower actuating lever 260 linked by a generally vertical insulator arm 262. Actuating lever 260 is integrally operable with interrupter cam member 278 on drive shaft 40 to actuate actuated lever switch 258 through insulating arm 262. Actuated lever switch 258 is a generally planar section mounted to the upper end of interrupter 12 at lever switch fulcrum 266, and has a connector end 268 and switch end 220 projecting therefrom. Connector end 268 is attached to one end of insulating arm 262 such that longitudinal movement of insulating arm 262 causes actuated lever switch 258 to rotate about fulcrum 266 to actuate switch end 220 to open and close interrupter 12 by the linear movement of plunger rod 252. Insulating arm 262 is a long planar member, having its other end rotatably interconnected to actuator lever 260.

Actuator lever 260 is located tangentially adjacent drive shaft 40, and has a cam follower 280 disposed at one end thereof and a pivot end 276 at its other end. Pivot end 276 is pivotally connected to base 72. Cam follower 280 is disposed adjacent drive shaft 40, and rides on an elliptical cam 278. Elliptical cam 278 is a flat planar member having an elliptical crosssection and mounted on shaft 40. Cam follower 280 rides on elliptical cam 278. Roller 280 is biased against elliptical cam 278 by interrupter spring 282 mounted between cam follower 274 and a spring flange 284 which is bolted to base 72.

As drive shaft 40 rotates, cam follower 280 rides along elliptical cam 278 to longitudinally actuate insulating arm 262 and thereby actuate actuated lever switch 258 to open and close interrupter 12. As roller 280 rides over the long axis of cam 278, the interrupter is opened to interrupt current through tap selector 8. As roller 280 passes the long axis of cam 278 and moves toward the short axis of cam 278, interrupter 12 is closed to reinitiate current through tap selector 8. Elliptical cam 278 includes lost motion slots 277, 279 disposed arcuately therein for receiving cam drive pins 291, 293 which protrude from the side face of cam actuator 44. The slots 277, 279 are arcuate, such that a period of rotation of cam actuator 44 is required to cause pins 291, 293 to traverse slots 277, 279 before causing elliptical cam 278 to rotate, thereby delaying the opening of the interrupter 12 until some motion of drive gear 40 has occurred. Thus, by changing the arcuate length of slots 277, 279, the point of initiating interrupter 12, bypass switch 46 and tap selection may be varied.

By synchronously indexing the bypass switch 46, interrupter 12, and Geneva gears 30, 32, through drive shaft 40, the actuation of bypass switch 46 is timed to open just before interrupter 12 opens and before moveable outer contacts 132 move off of a tap clip 164 just after it moves on to the next adjacent tap clip 164, and interrupter 12 is timed to open between the opening and closing of bypass switch 46. Thus, no arcing will occur from moveable outer contacts 132 to tap clip 164 as tap changes are performed. Further, the addition of lockout mechanism 102 adjacent Geneva gears 30, 32 prevents the improper simultaneous location of moveable outer contacts 132 on reversing tap 174 and ninth tap 164.

Although a preferred embodiment of the invention has been described, modifications may be made thereto without deviating from the scope of the invention.

I claim:

1. A rotary tap selector for selecting taps on a transformer including first and second rotary tap selector gears in shafted engagement with selector tap arms having actuator slots therein for receiving a pin mounted to a rotary pin drive shaft adjacent the gears for inducing rotary actuation thereof, the improvement therein comprising:

a selector gear travel limiting means disposed adjacent said selector gears and said drive shaft to limit the rotary travel of the gears to less than 360° in response to actuation thereof by the pin.

2. The rotary tap selector of claim 1, wherein said limiting means includes a pair of lock arms projecting parallel to and adjacent said gears.

3. The rotary tap selector of claim 1, wherein the gears each include a pin projecting therefrom opposite each other.

4. The rotary tap selector of claim 2, wherein said lockout arms are rotatably disposed on a mounting stud.

5. The rotary tap selector of claim 4, wherein said lockout arms include an arcuate recess for selectively receiving said pins.

6. The rotary tap selector of claim 5, wherein said lockout arms re interconnected such that arcuate movement of one lockout arm about said stud induces an equal arcuate movement of said other lockout arm.

7. A rotary tap selector including first and second rotary tap selector gears, the improvement therein comprising:

a selector gear travel limiting means having a pair of lockout arms disposed parallel to and adjacent said selector gears;

a limit pin mounted on each selector gear and projecting therefrom toward the adjacent selector gear;

said lockout arms including an arcuate pin recess thereon for selectively receiving said pins;

said lockout arms being interconnected and arcuately actuable about a stud, such that arcuate movement of one lockout arm about said stud causes equal arcuate movement of said other lockout arm about said stud;

said lockout arms being interconnected to a biasing means for selectively biasing one of said arcuate pin recesses adjacent the gears to selectively engage one of said gear pins.

8. The rotary tap changer of claim 7, wherein said biasing means includes a spring piston.

9. The rotary tap selector of claim 7, wherein said biasing means is a hydraulic piston.

10. The rotary tap changer of claim 7, wherein said lockout arms further include a rocker face wall disposed adjacent said arcuate pin recess, said rocker face wall disposed to engage said in on one of the gears thereby placing said arcuate pin recess on said other lockout arm in location to interferingly engage said in on the other gear.

* * * * *